(12) United States Patent
Moteki et al.

(10) Patent No.: US 10,223,804 B2
(45) Date of Patent: Mar. 5, 2019

(54) ESTIMATION DEVICE AND METHOD

(71) Applicant: FUJITSU LIMITED, Kawasaki-shi, Kanagawa (JP)

(72) Inventors: Atsunori Moteki, Kawasaki (JP); Nobuyasu Yamaguchi, Kawasaki (JP); Toshiyuki Yoshitake, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 15/352,722

(22) Filed: Nov. 16, 2016

(65) Prior Publication Data

US 2017/0154429 A1    Jun. 1, 2017

(30) Foreign Application Priority Data

Nov. 27, 2015 (JP) .................................. 2015-231989

(51) Int. Cl.
 *G06T 7/73* (2017.01)
(52) U.S. Cl.
 CPC ...... *G06T 7/74* (2017.01); *G06T 2207/10016* (2013.01); *G06T 2207/30244* (2013.01)
(58) Field of Classification Search
 None
 See application file for complete search history.

(56) References Cited

U.S. PATENT DOCUMENTS

| 8,337,405 B2* | 12/2012 | Waagen | G06T 7/269 |
| | | | 382/218 |
| 8,836,799 B2 | 9/2014 | Kim et al. | |
| 2013/0148851 A1* | 6/2013 | Leung | G06K 9/3241 |
| | | | 382/103 |
| 2014/0169636 A1 | 6/2014 | Hara et al. | |

(Continued)

FOREIGN PATENT DOCUMENTS

| CN | 104732518 A | * 6/2015 |
| JP | 2010-267232 | 11/2010 |

(Continued)

OTHER PUBLICATIONS

Machine translation of CN 104732518 A.*
Fast Relocalization for Visual Odometry Using Binary Features; J. Straub, S. Hilsenbeck, G. Schroth, R. Huitl, A. Moller, E. Steinbach; CSAIL, Massachusetts Institute of Technology, Cambridge, MA, USA Institute for Media Technology, Technische Universitat Munchen, Munich, Germany; pp. 2548-2552.

(Continued)

*Primary Examiner* — Michelle M Entezari (74) *Attorney, Agent, or Firm* — Oblon, McClelland, Maier & Neustadt, L.L.P.

(57) ABSTRACT

A method includes associating a plurality of first feature points with a plurality of second feature points, the plurality of first feature points being included in a keyframe that represents a first captured image at a first time when a position and an orientation of a camera are successfully estimated, the plurality of second feature points being included in a second captured image captured at a second time, calculating vectors based on feature descriptors of the first feature points and feature descriptors of the second feature points for respective pairs of the first feature points and the second feature points, determining whether an association of the first feature points and the second feature points is satisfactory, and performing an estimation process that estimates a new position and a new orientation of the camera at the second time when the association is determined to be satisfactory.

17 Claims, 11 Drawing Sheets

(56) References Cited

U.S. PATENT DOCUMENTS

| | | | | |
|---|---|---|---|---|
| 2014/0313339 | A1* | 10/2014 | Diessner | H04N 7/18 348/148 |
| 2015/0172626 | A1* | 6/2015 | Martini | G06T 7/0008 348/50 |
| 2015/0286891 | A1* | 10/2015 | Guan | G06T 7/0048 382/168 |
| 2016/0073111 | A1* | 3/2016 | Lee | H04N 19/124 375/240.03 |

FOREIGN PATENT DOCUMENTS

| | | |
|---|---|---|
| JP | 2012-221042 | 11/2012 |
| JP | 2014-112055 | 6/2014 |

OTHER PUBLICATIONS

EPnP: An Accurate O(n) Solution to the PnP Problem; Vincent Lepetit • Francesc Moreno-Noguer • Pascal Fua; Received: Apr. 15, 2008 / Accepted: Jun. 25, 2008 / Published online: Jul. 19, 2008 © Springer Science+Business Media, LLC 2008, pp. 155-166.

A Flexible New Technique for Camera Calibration; Zhengyou Zhang, Senior Member, IEEE; IEEE Transactions on Pattern Analysis and Machine Intelligence, vol. 22, No. 11, Nov. 2000; pp. 1330-1334.

\* cited by examiner

| MAP POINT ID | X [mm] | Y [mm] | Z [mm] | FEATURE DESCRIPTOR |
|---|---|---|---|---|
| 1 | 126 | 59 | 329 | (0.264, ...) |
| 2 | 314 | 193 | 289 | (0.822, ...) |
| 3 | 212 | 49 | 315 | (0.652, ...) |
| ⋮ | ⋮ | ⋮ | ⋮ | ⋮ |
| 68 | -237 | -21 | 291 | (0.740, ...) |

| NUMBER | POSITION AND ORIENTATION | CAPTURED IMAGE | FEATURE POINT GROUP [pixel] | MAP POINT ID GROUP |
|---|---|---|---|---|
| 1 | (0.24, 0.84, 0.96, 245.0, 313.9, 23.8) | (24, 46, ...) | (11, 42), (29, 110), (178, 90), (242, 310), ... | 3, 5, 9, 32, ... |
| 2 | (0.15, 0.90, 0.23, 93.3, 163.0, 73.2) | (25, 44, ...) | (92, 32), (41, 88), (201, 11), (231, 290), ... | 2, 11, 43, 51, ... |
| 3 | (0.64, 0.45, 0.12, 132.8, 77.3, 61.8) | (22, 40, ...) | (13, 27), (32, 38), (42, 103), (83, 55), ... | 4, 7, 28, 37, ... |
| ... | ... | ... | ... | ... |
| 25 | (0.54, 0.80, 0.92, 398.2, 310.2, 292.0) | (134, 89, ...) | (55, 120), (173, 193), (103, 167), (236, 262), ... | 32, 35, 58, 62, ... |

| MAP POINT ID | X [mm] | Y [mm] | Z [mm] | FEATURE DESCRIPTOR | x [pixel] | y [pixel] |
|---|---|---|---|---|---|---|
| 1 | 126 | 59 | 329 | (0.264, ...) | 82 | 254 |
| 2 | 314 | 193 | 289 | (0.822, ...) | 231 | 90 |
| 3 | 212 | 49 | 315 | (0.652, ...) | 186 | 256 |
| ⋮ | ⋮ | ⋮ | ⋮ | ⋮ | ⋮ | ⋮ |
| 68 | -237 | -21 | 291 | (0.740, ...) | 18 | 22 |

ESTIMATION DEVICE AND METHOD

CROSS-REFERENCE TO RELATED APPLICATION

This application is based upon and claims the benefit of priority of the prior Japanese Patent Application No. 2015-231989, filed on Nov. 27, 2015, the entire contents of which are incorporated herein by reference.

FIELD

The embodiments discussed herein are related to a technique of estimating a camera position and orientation.

BACKGROUND

In recent years, there has been a technique that estimates a position and orientation of a camera equipped in a personal computer (PC), a mobile terminal, a wearable terminal, or the like and, by using an estimation result, superimposes additional information onto an image displayed on a screen of the camera to support user operations.

During a user operation, since a camera position and orientation may frequently change, estimation of the camera position and orientation is likely to be temporarily unsuccessful. It is therefore desirable that a process of estimating a camera position and orientation be resumed from a state of unsuccessful estimation. In the following description, a process of resuming estimation of a camera position and orientation from a state of unsuccessful estimation may be referred to as a relocalization process.

An example of the related art for a relocalization process will be described. In the related art, keyframes each associating an image at the time of successful estimation with a camera position and orientation are generated intermittently at timings when a camera position and orientation are successfully estimated. In the related art, in attempting a relocalization process, the current camera position and orientation are estimated by detecting a keyframe that is close to a current image taken by the camera and associating a feature point of the detected keyframe with a feature point of the current image taken by the camera.

There is another related art that selects a set of feature points having a smaller error from a plurality of sets of feature points associating a keyframe with the current image and uses the selected set of feature points to perform a relocalization process.

Related arts are disclosed in U.S. Pat. No. 8,836,799 B2 and Japanese Laid-open Patent Publication No. 2012-221042, for example.

SUMMARY

According to an aspect of the invention, a method includes associating a plurality of first feature points with a plurality of second feature points, the plurality of first feature points being included in a keyframe that represents a first captured image at a first time when a position of a camera and an orientation of the camera are successfully estimated, the plurality of second feature points being included in a second captured image captured at a second time by the camera, calculating a plurality of vectors based on feature descriptors of the plurality of first feature points and feature descriptors of the plurality of second feature points for respective pairs of the plurality of first feature points and the plurality of second feature points, based on a distribution of the vectors, determining whether or not an association of the plurality of first feature points and the plurality of second feature points is satisfactory, and performing an estimation process that estimates a new position of the camera and a new orientation of the camera at the second time based on pairs of the plurality of first feature points and the plurality of second feature points when the association is determined to be satisfactory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The related art has a problem in that a relocalization process is performed even when an association of feature points by using a keyframe is incorrect.

For example, since an incorrect association of feature points causes degeneration of estimation accuracy of a camera position and orientation, the position at which additional information is superimposed on an image taken by the camera may shift from an appropriate position. Further, in the related art that selects a set of feature points having a smaller error from a plurality of sets of feature points, an incorrect association of feature points will result in an increase in the number of attempts of a process for selecting a set of feature points having a smaller error, which may cause a problem of an increase in a processing load.

In one aspect, a technique disclosed in the embodiments has the goal of performing a relocalization process based on a satisfactory association of feature points.

The embodiments of a camera position and orientation estimation device, a camera position and orientation estimation method, and a camera position and orientation estimation program disclosed in the present application will be described below in detail with reference to the drawings. Note that the disclosure is not limited by these embodiments.

First Embodiment

Figure 1:
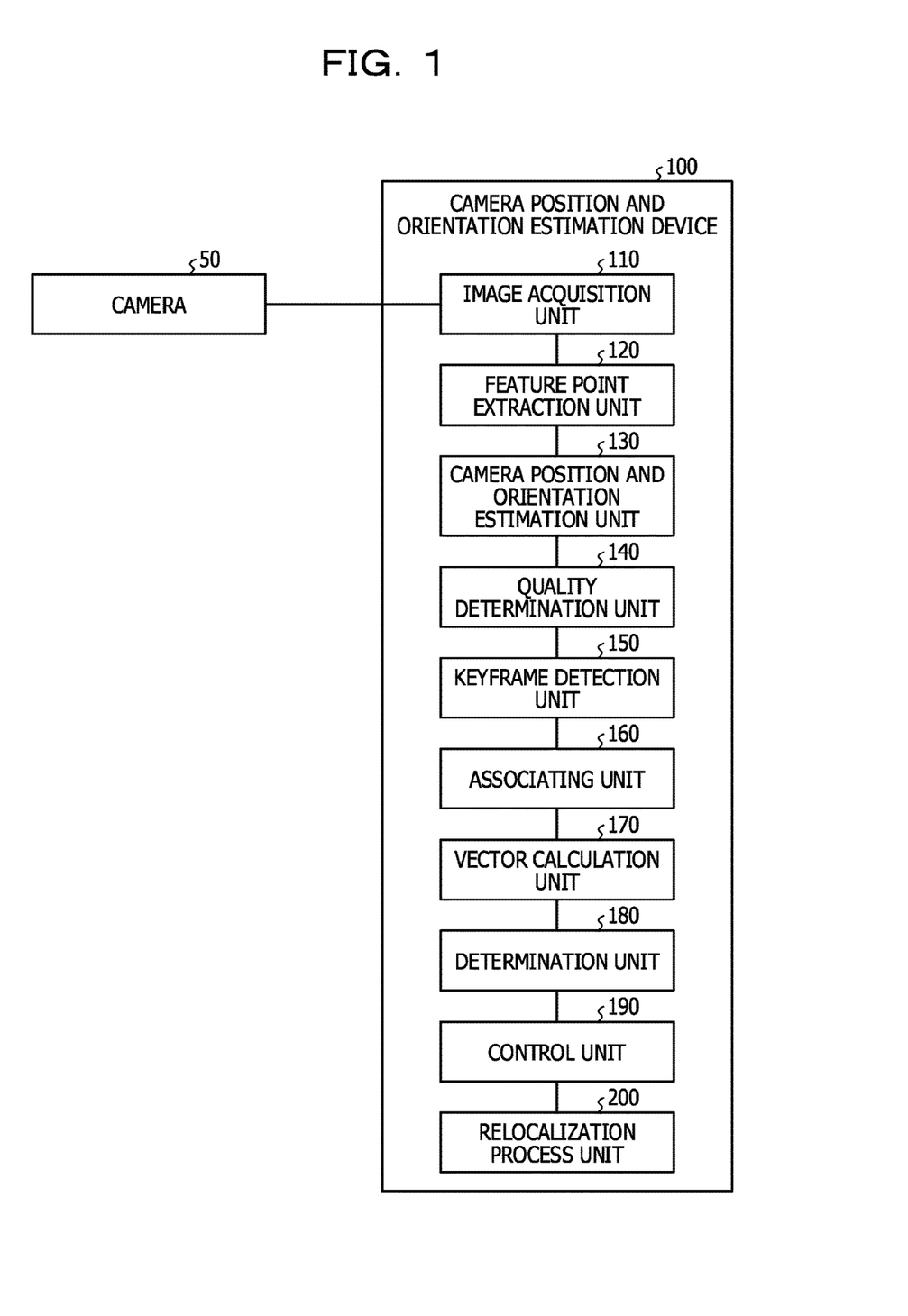
FIG. 1 is a functional block diagram illustrating a configuration of a camera position and orientation estimation device according to the embodiments.

FIG. 1 is a functional block diagram illustrating the configuration of a camera position and orientation estimation device according to the present embodiment. As illustrated in FIG. 1, a camera position and orientation estimation device 100 is connected to a camera 50. The camera position and orientation estimation device 100 has an image acquisition unit 110, a feature point extraction unit 120, and a camera position and orientation estimation unit 130. The camera position and orientation estimation device 100 has a quality determination unit 140, a keyframe detection unit 150, an associating unit 160, a vector calculation unit 170, a determination unit 180, a control unit 190, and a relocalization process unit 200. The vector calculation unit 170 is an example of an image association vector calculation unit.

The camera 50 is a single-lens red, green, and blue (RGB) camera equipped in a PC, a mobile terminal, a wearable terminal, or the like. The camera 50 captures an image from any point of view and outputs a captured image to the image acquisition unit 110.

The image acquisition unit 110 is a processing unit that is connected to the camera 50 and acquires a captured image from the camera 50. The image acquisition unit 110 outputs a captured image to the feature point extraction unit 120.

The feature point extraction unit 120 is a processing unit that extracts feature points from a captured image. For example, the feature point extraction unit 120 extracts feature points by executing SIFT, SURF, ORB, or the like. For example, a feature point may be a point corresponding to an edge or the like of a captured image. The feature point extraction unit 120 outputs information of feature points to the camera position and orientation estimation unit 130. The information of feature points includes two-dimensional coordinates and/or a feature descriptor for each feature point extracted from a captured image, for example. A feature descriptor is information such as a pixel value, a slope of an edge, or the like around a feature point.

The camera position and orientation estimation unit 130 is a processing unit that matches a feature point with a map point based on information of a feature point acquired from the feature point extraction unit 120 and a three-dimensional map and estimates the position and orientation of the camera 50 based on a matching result. As used herein, a three-dimensional map represents map points of three-dimensional coordinates that have been predefined with respect to an object.

Figure 2:
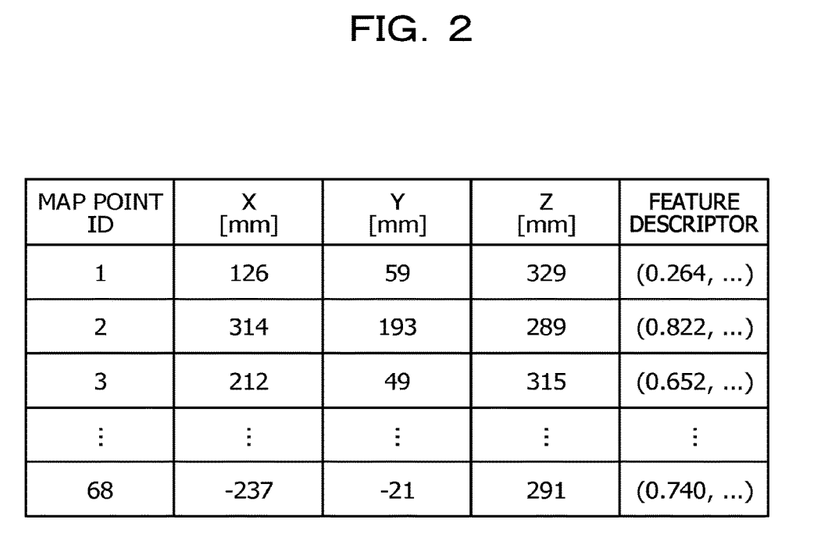
FIG. 2 is a diagram illustrating an example of data structure of a three-dimensional map.

FIG. 2 is a diagram illustrating an example of the data structure of a three-dimensional map. As illustrated in FIG. 2, the three-dimensional map associates map point IDs, values X, Y, and Z, and feature descriptors. In FIG. 2, a map point ID is a number that uniquely identifies a map point. In the example illustrated in FIG. 2, the three-dimensional map includes 68 map points. Values X, Y, and Z represent three-dimensional coordinates of a map point. A feature descriptor represents a feature descriptor of a projected point on an image when a map point is projected on the image captured by a camera 50. For example, a feature descriptor is information such as a pixel value, a slope of an edge, or the like around a projected point.

An example of a process in which the camera position and orientation estimation unit 130 matches a map point with a feature point will be described. The camera position and orientation estimation unit 130 uses a previously estimated position and orientation of the camera 50 to determine which map point of a three-dimensional map a feature point corresponds to. The camera position and orientation estimation unit 130 calculates coordinates at which a map point is projected on a captured image for the previous time by using Equation (1). In the following description, a map point projected on a captured image may be referred to as a projection point.

$$\begin{pmatrix} u \\ v \\ 1 \end{pmatrix} = A(R|t) \begin{pmatrix} X \\ Y \\ Z \\ 1 \end{pmatrix} \quad (1)$$

In Equation (1), the term A is a matrix with three rows by three columns and is associated with an internal parameter of the camera 50. A user calibrates the camera 50 in advance based on a disclosure of the reference "Z. Zhang, A flexible new technique for camera calibration, IEEE Transactions on Pattern Analysis and Machine Intelligence, Vol. 22, No. 11, pp. 1330-1334 (2000)."

In Equation (1), the term (RR) is a matrix of three rows by four columns obtained by transforming a previously estimated position and orientation of the camera 50 into a rotation matrix R of three rows by three columns and a translation vector t by using Rodrigues' Rotation Formula expressed by Equation (2) and combining the rotation matrix R and the translation vector t. Coordinates (u, v) are two-dimensional coordinates of a projection point when a map point is projected on a captured image. Coordinates (X, Y, Z) are three-dimensional coordinates of each map point.

$$R = \cos\theta * I + (1 - \cos\theta) * rr^T + \sin\theta * \begin{bmatrix} 0 & -r_3 & r_2 \\ r_3 & 0 & -r_1 \\ -r_2 & r_1 & 0 \end{bmatrix}^t \quad (2)$$

In Equation (2), the term I represents a unit matrix. The term $\theta$ is defined by Equation (3). The term r is defined by Equation (4).

$$\theta = \sqrt{r_1^2 + r_2^2 + r_3^2} \quad (3)$$

$$r = \begin{pmatrix} r_1 \\ r_2 \\ r_3 \end{pmatrix} \quad (4)$$

Figure 3:
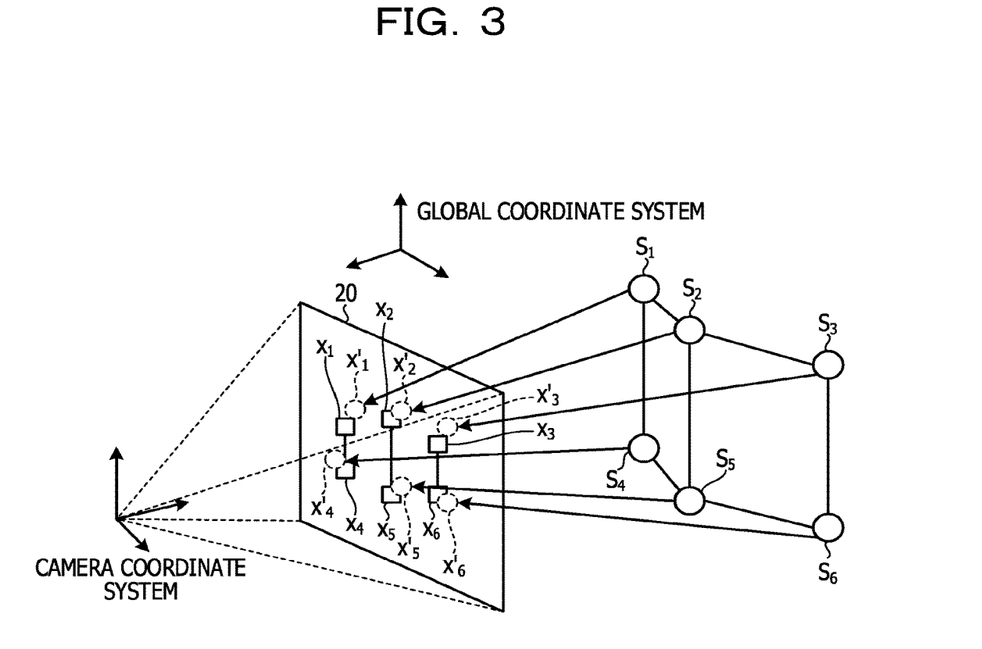
FIG. 3 is a diagram illustrating a process of the camera position and orientation estimation device.

FIG. 3 is a diagram for illustrating a process of the camera position and orientation estimation unit 130. Let us assume that there are map points $S_1$ to $S_6$ in FIG. 3. Further, it is assumed that there are feature points $x_1$ to $x_6$ in a captured image 20. The camera position and orientation estimation unit 130 projects the map points $S_1$ to $S_6$ on the captured image 20 based on Equation (1) to obtain projection points $x_1'$ to $x_6'$.

The camera position and orientation estimation unit 130 calculates respective distances from projection points to feature points on the current captured image located within a certain threshold range. The camera position and orientation estimation unit 130 determines a projection point and a feature point having the smallest distance and pairs a map point corresponding to the determined projection point and the feature point. The camera position and orientation estimation unit 130 repeats the above process for all the projection points and matches a map point corresponding to a projection point with a feature point on the current captured image. The threshold may be 20 pixels, for example.

For example, in the example depicted in FIG. 3, since the distance between the feature point $x_1$ and the projection point $x_1'$ is the shortest, the feature point $x_1$ and the map point $S_1$ corresponding to the projection point $x_1'$ are paired. In a similar manner, the feature points $x_2$ to $x_6$ are paired with the map points $S_2$ to $S_6$, respectively.

After performing matching, the camera position and orientation estimation unit 130 performs a process of estimating the position and orientation of the camera 50. When there are three or more pairs of feature points and map points, the camera position and orientation estimation unit 130 estimates a camera position and orientation by using a PnP algorithm. For example, the camera position and orientation estimation unit 130 may estimate a position and orientation by using a PnP algorithm described in the reference "V. Lepetit et al., EPnP: An Accurate O(n) Solution to the PnP Problem, International Journal of Computer Vision, Vol. 81, Issue 2, pp. 155-166 (2008)."

The camera position and orientation estimation unit 130 outputs information of the estimated camera position and orientation to the quality determination unit 140. Further, the camera position and orientation estimation unit 130 outputs to the quality determination unit 140 the total number of map points included in the three-dimensional map and the number of matched pairs.

The quality determination unit 140 is a processing unit that determines the quality of a position and orientation of the camera 50 estimated by the camera position and orientation estimation unit 130. For example, the quality determination unit 140 calculates a ratio of the number of matched pairs to the total number of map points included in the three-dimensional map. When the calculated ratio is greater than or equal to a predetermined ratio, the quality determination unit 140 determines that an estimate value of the position and orientation of the camera 50 is of high quality. On the other hand, when the calculated ratio is less than the predetermined ratio, the quality determination unit 140 determines that an estimate value of a position and orientation of the camera 50 is of low quality. For example, the predetermined ratio may be 30%.

When having determined that an estimation value of a position and orientation of the camera 50 is of high quality, the quality determination unit 140 concludes that the current position and orientation of the camera 50 is a position and orientation estimated by the camera position and orientation estimation unit 130 and stores the current position and orientation of the camera 50 in a predetermined storage unit. An HMD display control unit (not illustrated) looks up a camera position and orientation stored in the storage unit and utilizes the position and orientation to cause a display of the HMD to display an image where additional information is superimposed on an image captured by the camera 50.

When having determined that an estimation value of a position and orientation of the camera 50 is of low quality, the quality determination unit 140 outputs a request for a relocalization process to the keyframe detection unit 150.

The keyframe detection unit 150 is a processing unit that, when having acquired a request for a relocalization process from the quality determination unit 140, compares the current captured image to a keyframe table and detects a reference keyframe. The keyframe detection unit 150 outputs information of a reference keyframe to the associating unit 160.

Figure 4:
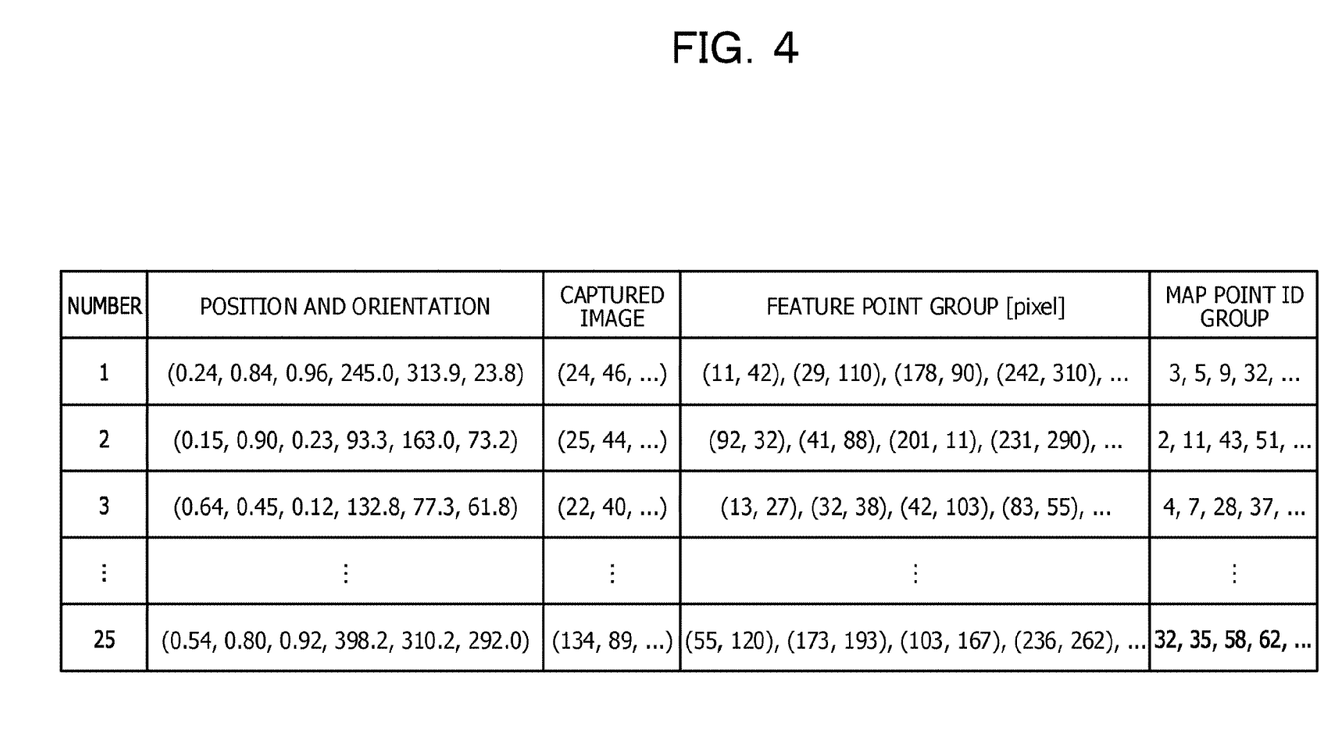
FIG. 4 is a diagram illustrating an example of data structure of a keyframe table.

FIG. 4 is a diagram illustrating an example of the data structure of a keyframe table. As illustrated in FIG. 4, this keyframe table associates numbers, values of position and orientation, captured images, feature point groups, and map point ID groups. A number in FIG. 4 represents a number that uniquely identifies a keyframe. A value of position and orientation represents a position and orientation of a camera. A captured image is image data captured by the camera at the time when a position and orientation of the camera is successfully estimated. A feature point group represents two-dimensional coordinates of respective feature points included in a keyframe. A map point ID group represents information that uniquely identifies respective map points associated with respective feature points.

For example, an association of feature points and map points is indicated in the order of coordinates in a feature point group and in the order in a map point ID group of FIG. 4. For example, the coordinates of a feature point associated with a map point ID "3" are "11, 42". In the example illustrated in FIG. 4, a keyframe table includes 25 keyframes.

A position and orientation is expressed in six dimensions (r1, r2, r3, t1, t2, t3). In these six values, values (r1, r2, r3) represent a camera orientation in the global coordinate system. Values (t1, t2, t3) represent a camera position in the global coordinate system.

An exemplary process in which the keyframe detection unit 150 detects a keyframe having a captured image that is the closest to the current captured image will now be described. The keyframe detection unit 150 reduces the current captured image and a captured image of each keyframe to a predetermined size, calculates a Sum of Squared Distance (SSD) for each pixel while blurring the reduced images by using a Gaussian filter, and determines a keyframe having the smallest SSD value as a reference keyframe. The keyframe detection unit 150 outputs information of the current captured image and information of the reference keyframe to the associating unit 160.

The associating unit 160 is a processing unit that associates a plurality of feature points included in a reference keyframe with a plurality of feature points included in the current captured image. In the following description, a feature point included in a reference keyframe may be referred to as a first feature point, and a feature point included in the current captured image may be referred to as a second feature point.

The associating unit 160 compares a feature descriptor of each first feature point to a feature descriptor of each second feature point and associates and pairs the first feature point and the second feature point which have the highest similarity in the feature descriptor. For example, the associating unit 160 calculates a comparison value based on Equation (5), where the feature descriptor of a first feature point is fb and the feature descriptor of a second feature point is fc, and determines that a smaller feature descriptor indicates a greater similarity.

$$\text{Comparison value} = |fb - fc| \quad (5)$$

The associating unit 160 repeats a process for determining one of the unassociated second feature points which has the highest similarity to an unassociated first feature point and pairs these first and second feature points to generate a plurality of pairs of the first feature point and the second feature point. The associating unit 160 outputs information of pairs of the associated first feature points and second feature points to the vector calculation unit 170.

The vector calculation unit 170 is a processing unit that calculates an image associated vector that is based on a feature descriptor of a first feature point and a feature descriptor of a second feature point for each pair of a first feature point and a second feature point associated by the associating unit 160. The vector calculation unit 170 outputs information of the calculated image associated vector to the determination unit 180. In the following description, an image associated vector is simply referred to as a vector.

For example, the vector calculation unit 170 calculates a vector v of the associated first feature point and second feature point based on Equation (6), where coordinates in an image of a first feature point are (ub, vb) and coordinates in an image of a second feature point are (uc, vc). The vector calculation unit 170 calculates the vector v for each pair of the associated first feature point and second feature point.

$$\text{Vector } v=(uc-ub, vc-vb) \quad (6)$$

The determination unit 180 is a processing unit that determines, based on a distribution of a plurality of vectors calculated by the vector calculation unit 170, whether or not an association of first feature points and second feature points is satisfactory. The determination unit 180 outputs a determination result to the control unit 190.

The determination unit 180 calculates an average "a" of the lengths of the vectors and a standard deviation $\sigma$ of the lengths of the vectors, and determines whether or not the average "a" and the standard deviation $\sigma$ satisfy condition 1 and condition 2. A reference value A and a reference value $\Sigma$ have been set in advance by a user.

Condition 1: average "a"<reference value A
Condition 2: standard deviation $\sigma$<reference value $\Sigma$ For example, when both condition 1 and condition 2 are satisfied, the determination unit 180 determines that an association of a first feature point and a second feature point is satisfactory. On the other hand, when the condition 1 is not satisfied or the condition 2 is not satisfied, the determination unit 180 determines that an association of a first feature point and a second feature point is not satisfactory.

Figure 5:
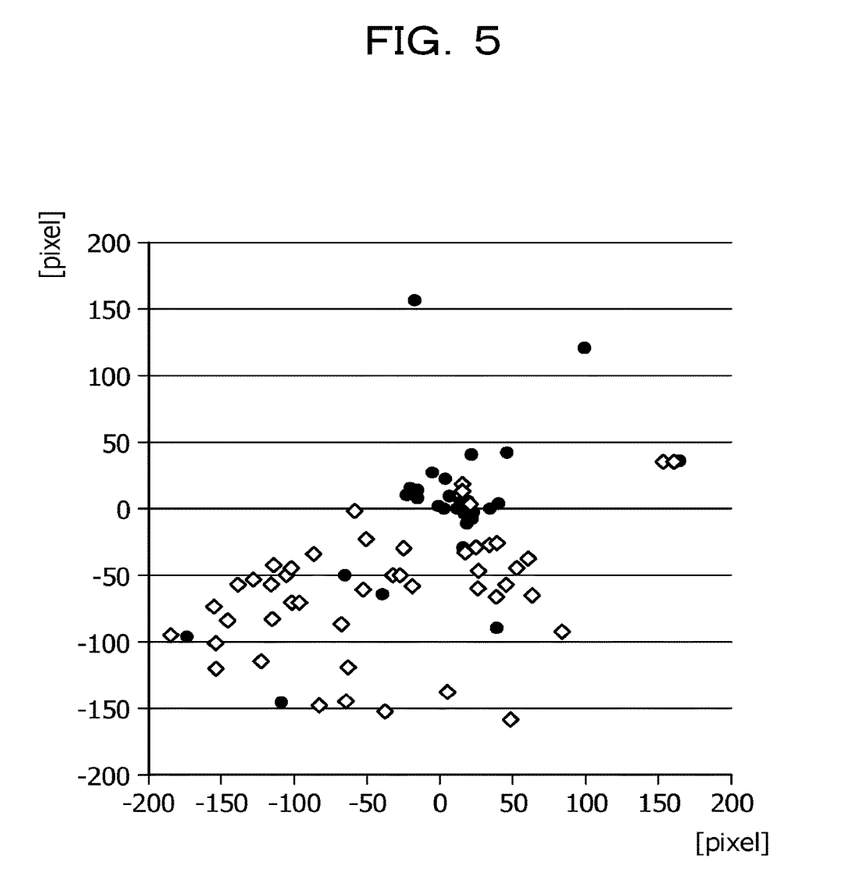
FIG. 5 is a diagram illustrating an example of a vector distribution.

FIG. 5 is a diagram illustrating an example of a distribution of vectors. In FIG. 5, the horizontal axis is an axis corresponding to a component (the first component (uc−ub)) in the x-axis direction of vectors, and the vertical axis is an axis corresponding to a component (the second component (vc−vb)) in the y-axis direction of vectors. In FIG. 5, each circle mark represents a position corresponding to each vector where it is determined that an association of a first feature point and a second feature point is satisfactory. Each rhombus mark represents a position corresponding to each vector where it is determined that an association of a first feature point and a second feature point is not satisfactory.

As illustrated in FIG. 5, when an association of first feature points and second feature points is satisfactory, vectors are distributed near the origin (0, 0). In contrast, when an association of first feature points and second feature points is not satisfactory, vectors are not distributed near the origin (0, 0) and are widely spread.

Referring back to FIG. 1, when it is determined by the determination unit 180 that an association of first feature points and second feature points is not satisfactory, the control unit 190 does not perform a process of estimating a camera position and orientation. On the other hand, when it is determined by the determination unit 180 that an association of first feature points and second feature points is satisfactory, the control unit 190 requests a relocalization process from the relocalization process unit 200.

Further, when it is determined by the determination unit 180 that an association of first feature points and second feature points is not satisfactory, the control unit 190 may cause a display device (not illustrated) to display information indicative of being unable to perform estimation of a camera position and orientation.

The relocalization process unit 200 is a processing unit that performs a relocalization process upon receiving a request for a relocalization process from the determination unit 180. For example, the relocalization process unit 200 estimates a position and orientation of the camera 50 based on an image-to-map method. The image-to-map method is for estimating a camera position and orientation by combining processes of the associating unit 160 and the camera position and orientation estimation unit 130. The relocalization process unit 200 stores estimation results of a camera position and orientation in a predetermined storage unit.

The relocalization process unit 200 may utilize a relationship between a feature point of a reference keyframe associated by the associating unit 160 and a feature point of the current captured image. As illustrated in FIG. 4, a feature point of a keyframe is associated with a map point ID. Therefore, a relationship between a feature point of the current captured image and a map point ID can be obtained from a relationship between a feature point of a reference keyframe and a feature point of the current captured image.

Figure 6:
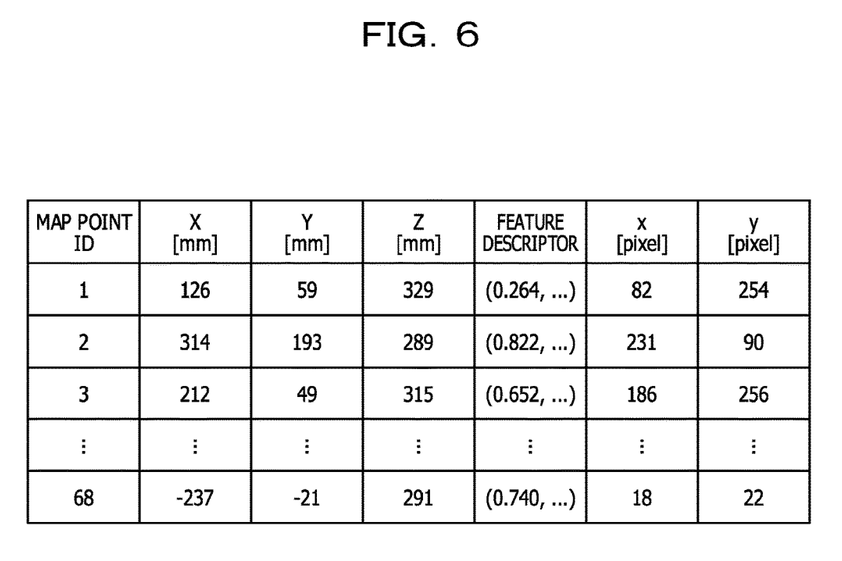
FIG. 6 is a diagram illustrating an example of data structure of a three-dimensional map associated with feature points on a captured image.

FIG. 6 is a diagram illustrating an example of the data structure of a three-dimensional map associated with feature points on a captured image. In FIG. 6, map point IDs, values X, Y, and Z, and feature descriptors are the same as those described for FIG. 2. Values x and y indicate an x coordinate and a y coordinate of each feature point on a captured image associated with a map point.

When there are three or more pairs of a feature point and a map point, the relocalization process unit 200 estimates a camera position and orientation by using the PnP algorithm.

Figure 7:
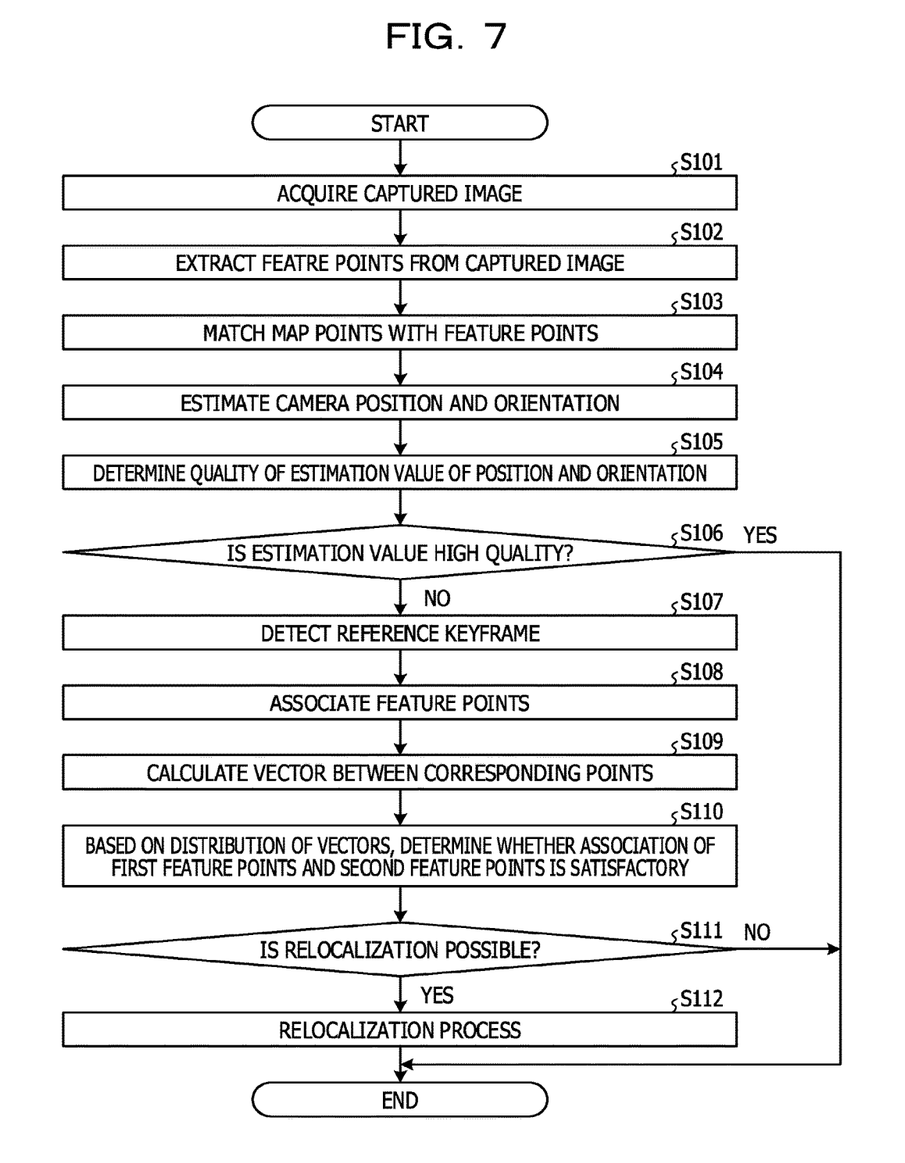
FIG. 7 is a flowchart illustrating steps of a process of the camera position and orientation estimation device according to the present embodiment.

Next, steps of a process of the camera position and orientation estimation device 100 according to the present embodiment will be described. FIG. 7 is a flowchart illustrating steps of a process of the camera position and orientation estimation device 100 according to the present embodiment. As illustrated in FIG. 7, the image acquisition unit 110 of the camera position and orientation estimation device 100 acquires captured images (step S101). The feature point extraction unit 120 of the camera position and orientation estimation device 100 extracts feature points from captured images (step S102).

The camera position and orientation estimation unit 130 of the camera position and orientation estimation device 100 matches map points with feature points (step S103) and estimates a camera position and orientation (step S104). The quality determination unit 140 of the camera position and orientation estimation device 100 determines the quality of an estimation value of a position and orientation (step S105).

The quality determination unit 140 determines whether or not an estimation value is of high quality (step S106). If the estimation value is of high quality (step S106, Yes), the quality determination unit 140 completes the process.

On the other hand, if the estimation value is not determined as high quality by the quality determination unit 140 (step S106, No), the keyframe detection unit 150 of the camera position and orientation estimation device 100 detects a reference keyframe (step S107).

The associating unit 160 of the camera position and orientation estimation device 100 associates first feature points of a reference keyframe with second feature points of the current captured image (step S108). The vector calculation unit 170 of the camera position and orientation estimation device 100 calculates vectors between respective associated points (step S109).

The determination unit 180 of the camera position and orientation estimation device 100 determines based on a distribution of a plurality of vectors whether or not an association of first feature points and second feature points is satisfactory (step S110).

If an association of first feature points and second feature points is not satisfactory, the determination unit 180 determines that a relocalization process is unable to be performed (step S111, No), and completes the process without performing a relocalization process. That is, if it is determined that an association of first feature points and second feature points is not satisfactory, the control unit 190 of the camera position and orientation estimation device 100 controls the process so that no relocalization process is performed by the relocalization process unit 200.

On the other hand, if an association of first feature points and second feature points is satisfactory, the determination unit 180 determines that a relocalization process is able to be performed (step S111, Yes). The relocalization process unit 200 of the camera position and orientation estimation device 100 performs a relocalization process (step S112).

Next, advantages of the camera position and orientation estimation device 100 according to the present embodiment will be described. When the quality of a camera position and orientation is low and a relocalization process is thus performed, the camera position and orientation estimation device 100 associates first feature points of a reference keyframe and second feature points of a captured image and, based on a distribution of feature points, determines whether or not an association is satisfactory. The camera position and orientation estimation device 100 does not perform a relocalization process when the association is determined to be not satisfactory. This can inhibit a relocalization process under an incorrect association of feature points and allows a relocalization process based on a satisfactory relationship between feature points to be performed.

Further, being able to perform a relocalization process based on a satisfactory relationship between feature points can improve the accuracy of camera position and orientation estimation by a relocalization process. Further, being able to perform a relocalization process based on a satisfactory relationship between feature points can reduce the number of attempts for a process of selecting a pair of feature points having a smaller error and therefore reduce a processing load.

The camera position and orientation estimation device 100 determines that an association of first feature points and second feature points is not satisfactory when an average of the lengths of the vectors is greater than or equal to a reference average and a standard deviation of the lengths of the vectors is greater than or equal to a reference deviation. As illustrated in FIG. 5, vectors are distributed near the origin (0, 0) when an association of first feature points and second feature points is satisfactory. In contrast, there is a tendency that the vectors are widely spread out without being distributed near the origin (0, 0) when an association of first feature points and second feature points is not satisfactory. Therefore, the determination described above allows for accurate determination as to whether or not an association of first feature points and second feature points is satisfactory.

The above process of the camera position and orientation estimation device 100 is a mere example, and the camera position and orientation estimation device 100 may perform other processes. Other processes (1) and (2) of the camera position and orientation estimation device 100 will be described below.

Another process (1) of the camera position and orientation estimation device 100 will be described. The determination unit 180 of the camera position and orientation estimation device 100 calculates a median vm of a plurality of vectors v calculated by the vector calculation unit 170. The determination unit 180 calculates a distance between a vector v and a median vm for each vector v based on Equation (7).

$$\text{Distance} = |v - vm| \quad (7)$$

When, among all the vectors v, a percentage of vectors having a distance smaller than a threshold Dt is greater than or equal to r %, the determination unit 180 determines that an association of first feature points and second feature points is satisfactory. On the other hand, when the percentage of vectors having a distance smaller than a threshold Dt among all the vectors v is less than r %, the determination unit 180 determines that an association of first feature points and second feature points is not satisfactory.

Figure 8:
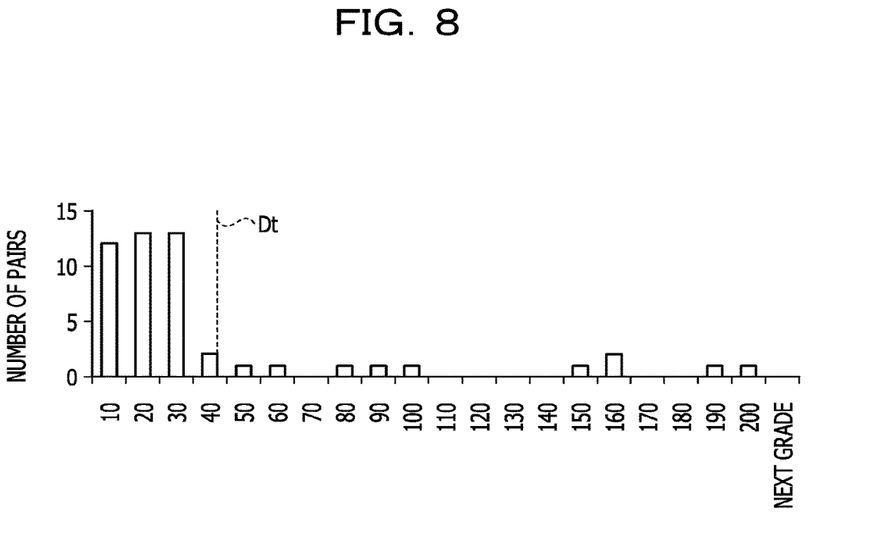
FIG. 8 is a first diagram for illustrating another process of a determination unit.
Figure 9:
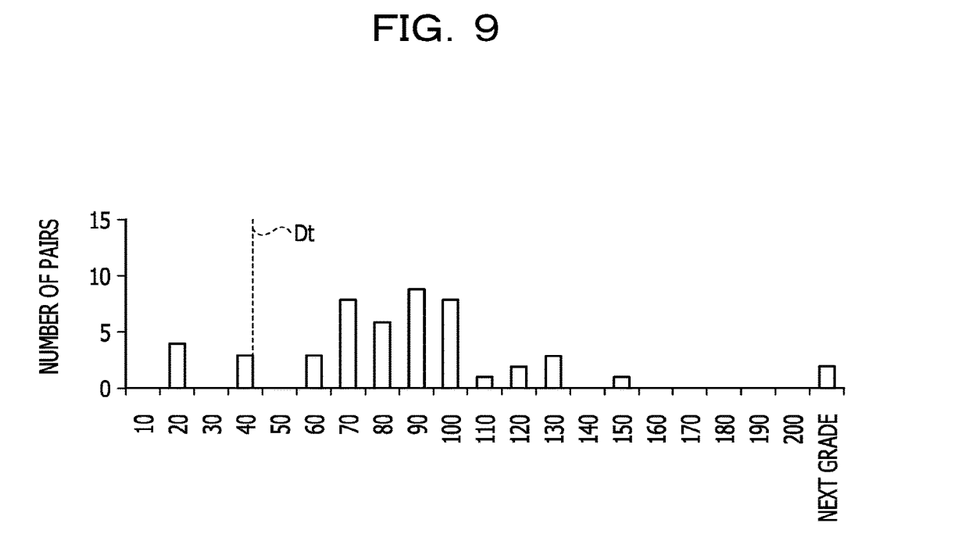
FIG. 9 is a second diagram for illustrating another process of the determination unit.

FIG. 8 and FIG. 9 are diagrams for illustrating other processes of the determination unit 180. The horizontal axis of each histogram illustrated in FIG. 8 and FIG. 9 represents the distance, the vertical axis represents the number of pairs of a first feature point and a second feature point. The number of pairs is the same as the number of vectors v. As an example, the threshold Dt is 40.

FIG. 8 illustrates a histogram when a ratio of pairs having a distance smaller than a threshold Dt among all the pairs is greater than or equal to r %. Such a histogram indicates that the association of first feature points and second feature points is satisfactory. When a ratio of pairs having a distance smaller than a threshold Dt among all the pairs is greater than or equal to r %, vectors are distributed near the origin (0, 0), as illustrated for circle marks of FIG. 5.

FIG. 9 illustrates a histogram when a ratio of pairs having a distance smaller than a threshold Dt among all the pairs is less than r %. Such a histogram indicates that an association of first feature points and second feature points is not satisfactory. When a ratio of pairs having a distance smaller than a threshold Dt among all the pairs is less than r %, vectors are widely spread out without being distributed near the origin (0, 0), as illustrated by rhombus marks in FIG. 5.

As described above, the determination unit 180 calculates a distance between a vector v and a median vm for each vector v and determines that an association is not satisfactory when vectors whose calculated distance is greater than or equal to a threshold occupy a predetermined percentage or more of all the vectors. This can inhibit a relocalization process in the case of an incorrect association.

Another process (2) of the camera position and orientation estimation device 100 will be described. When having accepted a request for a relocalization process from the control unit 190, the relocalization process unit 200 of the camera position and orientation estimation device 100 estimates a position and orientation of the camera 50 based on the image-to-map method.

In estimating a position and orientation of the camera 50 based on the image-to-map method, the relocalization process unit 200 performs a relocalization process by using one or more pairs of a first feature point and a second feature point of all the pairs associated by the associating unit 160 in which the one or more pairs have a distance smaller than a threshold. The distance is a value calculated by Equation (7) described above.

Figure 10:
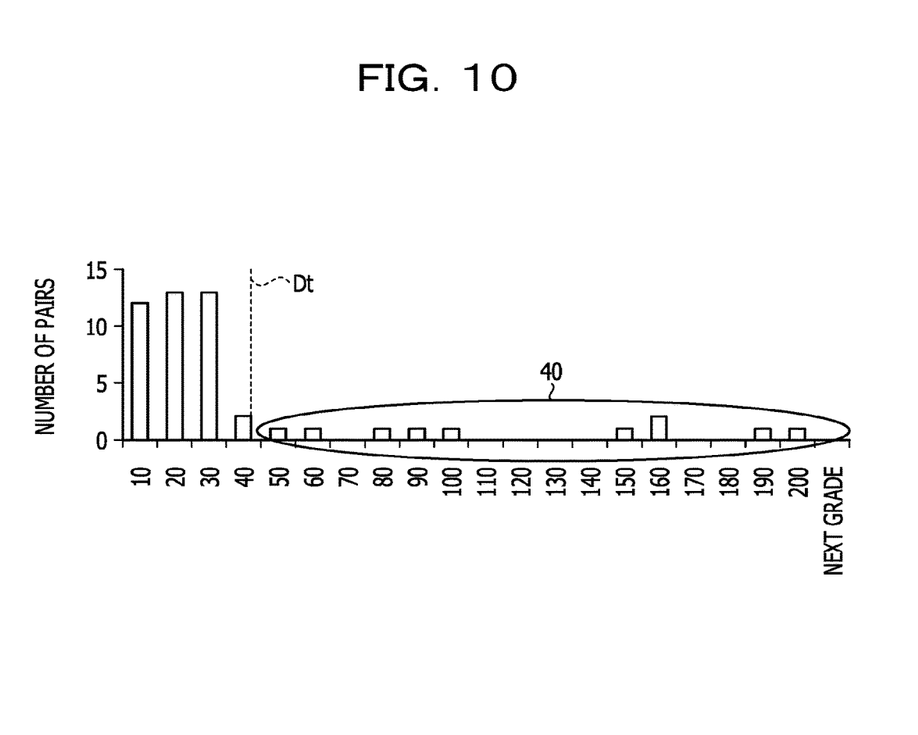
FIG. 10 is a diagram illustrating another process of a relocalization process unit.

FIG. 10 is a diagram for illustrating the above processes of the relocalization process unit 200. The horizontal axis of a histogram illustrated in FIG. 10 represents the distance, and the vertical axis represents the number of pairs of a first feature point and a second feature point. The number of pairs is the same as the number of vectors v. The relocalization process unit 200 utilizes one or more pairs having a distance smaller than a threshold Dt to estimate a position and orientation of the camera 50 based on the image-to-map method. That is, the relocalization process unit 200 performs a relocalization process without using pairs whose relationship of the distance between a vector and a median is included in an area 40. This can inhibit a relocalization process from being performed in the case of an incorrect association.

Note that, although description has been provided for the case where the camera position and orientation estimation unit 130 and the relocalization process unit 200 of the present embodiment estimate a position and orientation of the camera 50 based on the image-to-map method as an example, the embodiments are not limited thereto. For example, the camera position and orientation estimation unit 130 and the relocalization process unit 200 may use other well-known techniques such as the image-to-image method or the like to estimate a position and orientation of a camera and/or perform a relocalization process.

Figure 11:
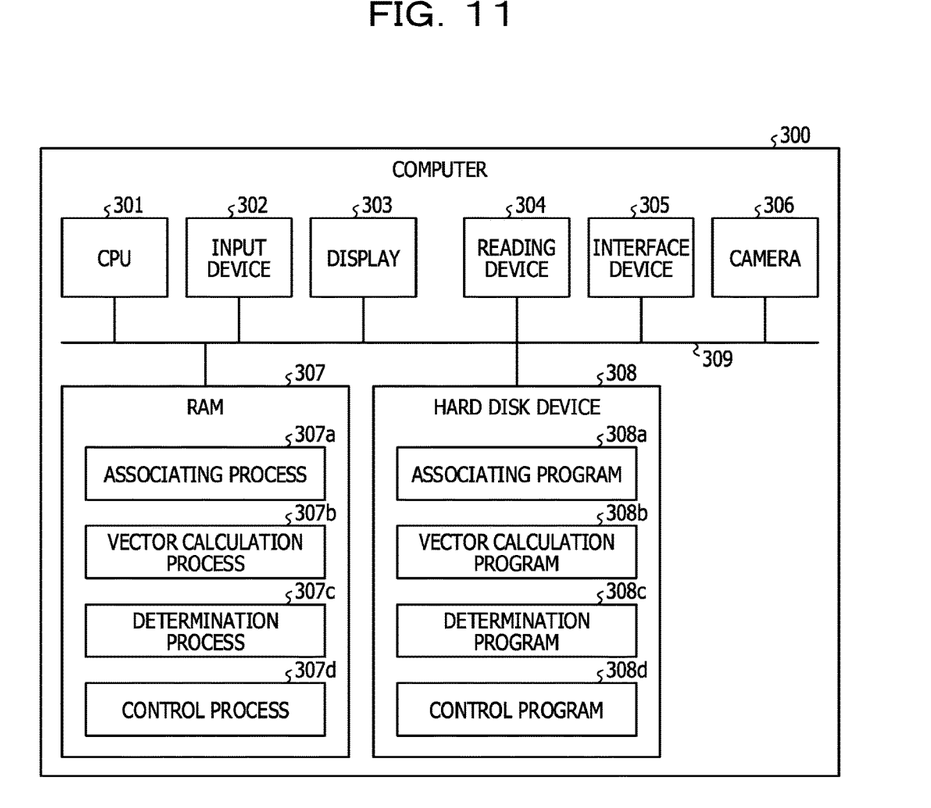
FIG. 11 is a diagram illustrating an example of a computer that executes a camera position and orientation estimation program.

Next, description will be provided for an example of a computer that executes a camera position and orientation estimation program for implementing the same functions as the camera position and orientation estimation device 100 illustrated in the above embodiments. FIG. 11 is a diagram illustrating an example of a computer that executes a camera position and orientation estimation program.

As illustrated in FIG. 11, a computer 300 has a CPU 301 that executes various operations, an input device 302 that accepts data inputs from the user, and a display 303. Further, the computer 300 has a reading device 304 that reads a program or the like from a storage medium, an interface device 305 that communicates data with other computers via a network, and a camera 306. Further, the computer 300 has a RAM 307 that temporarily stores various information and a hard disk device 308. Each of the devices 301 to 308 is connected to a bus 309.

The hard disk device 308 has an associating program 308a, a vector calculation program 308b, a determination program 308c, and a control program 308d. The CPU 301 reads the associating program 308a, the vector calculation program 308b, the determination program 308c, and the control program 308d and expands them to the RAM 307.

The associating program 308a functions as an associating process 307a. The vector calculation program 308b functions as a vector calculation process 307b. The determination program 308c functions as a determination process 307c. The control program 308d functions as a control process 307d.

A process of the associating process 307a corresponds to a process of the associating unit 160. A process of the vector calculation process 307b corresponds to a process of the vector calculation unit 170. A process of the determination process 307c corresponds to a process of the determination unit 180. A process of the control process 307d corresponds to a process of the control unit 190.

Note that the associating program 308a, the vector calculation program 308b, the determination program 308c, and the control program 308d may not necessarily be stored in advance in the hard disk device 308. For example, each of such programs may be stored in a "portable physical medium" such as a floppy disk (FD), a CD-ROM, a DVD disk, a magneto-optical disk, an IC card, or the like that can be inserted in the computer 300. The computer 300 may then read and execute each of the programs 308a to 308d.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a processor, the method comprising:
   acquiring a first image captured by a camera at a first time;
   performing a first process that matches a group of first feature points extracted from the first image with map points having three-dimensional coordinates predefined for an object;
   estimating, based on a number of map points that match to the first image by the first process, an accuracy of first position and orientation information Obtained by using a result of the first process, the first position and orientation information indicating a position and an orientation of a camera at the first time;
   storing, in a memory, keyframe information including information of each of the group of first feature points when the estimated accuracy is higher than or equal to a first threshold;
   acquiring a second image captured by the camera at a second time that is after the first time;
   performing the first process on a group of second feature points extracted the second image and the map points;
   estimating, based on another number of map points matched to the second image by the first process, an accuracy of second position and orientation information obtained by using another result of the first process, the second position and orientation information indicating a position and an orientation of the camera at the second time;
   performing a second process that identifies pairs of respective of the group of second feature points with corresponding first feature points based on the keyframe information to generate a plurality of pairs where the estimated accuracy of the second position and orientation is less than the first threshold;
   generating vectors for respective of the plurality of pairs;
   generating new second position and orientation information by using at least a part of the plurality of pairs when a standard deviation of the lengths of the vectors is less than a second threshold; and
   outputting the new second position and orientation information to a display control process that performs display control for displaying additional information on the second image based on the new second position and orientation information.

2. The method according to claim 1, wherein
   the keyframe information further includes the first position and orientation information, and the new second position and orientation information is generated by further using the keyframe information when the standard deviation of the lengths of the vectors is less than the second threshold.

3. The method according to claim 1, wherein
the first process matches one or more of the first feature points with one or more of the map points based on respective first feature descriptors of the group of first feature points and respective second feature descriptors of the second feature points,
the both of the one or more of the first feature points and the one or more of the map points have feature descriptors greater than a third threshold, and
the second process pairs respective ones of the group of second feature points with any of the first feature points in an order from one of the group of second feature points having a third feature descriptor which is most similar to any of the first feature descriptors of the group of first feature points.

4. A method executed by a processor; the method comprising:
associating a plurality of first feature points with a plurality of second feature points, the plurality of first feature points being included in a keyframe that represents a first captured image at a first time when a position of a camera and an orientation of the camera are successfully estimated, the plurality of second feature points being included in a second captured image captured at a second time by the camera;
calculating a plurality of vectors based on feature descriptors of the plurality of first feature points and feature descriptors of the plurality of second feature points for respective pairs of the plurality of first feature points and the plurality of second feature points;
determining, when a standard deviation of the lengths of the plurality of vectors is less than a first threshold, that an association of the plurality of first feature points and the plurality of second feature points is satisfactory; and
performing an estimation process that estimates a new position of the camera and a new orientation of the camera at the second time based on pairs of the plurality of first feature points and the plurality of second feature points.

5. The method according to claim 4, wherein the estimation process at the second time is not performed when the association is determined to be not satisfactory.

6. The method according to claim 4, further comprising:
determining, when an average of lengths of the plug of vectors is less than a second threshold, that the association is satisfactory.

7. The method according to claim 4, further comprising:
determining, when an average of lengths of the plurality of vectors is less than a second threshold and the standard deviation of the lengths of the plurality of vectors is less than first threshold, that the association is satisfactory.

8. The method according to claim 4, further comprising:
calculating a ratio of a number of vectors whose distance between a median and each of the plurality of vectors is greater than or equal to a third threshold, the median being determined based on of the plurality of vectors; and
determining that the association is satisfactory when the ratio is less than a fourth threshold.

9. The method according to claim 8, wherein the estimation process estimates the new position and orientation by using pairs of first feature points and second feature points whose distance between the median and an image associated vector is less than a fifth threshold.

10. The method according to claim 5, further comprising:
causing a display device to display information indicating that the estimation process is not performed when the association is determined to be not satisfactory.

11. A device; comprising:
a memory; and
a processor coupled to the memory and configured to:
associate a plurality of first feature points with a plurality of second feature points, the plurality of first feature points being included in a keyframe that represents a first captured image at a first time when a position of a camera and an orientation of the camera are successfully estimated, the plurality of second feature points being included in a second captured image captured at a second time by the camera;
calculate a plurality of vectors based on feature descriptors of the plurality of first feature points and feature descriptors of the plurality of second feature points for respective pairs of the plurality f first feature points and the plurality of second feature points;
determine, when a standard deviation of the lengths of the plurality of vectors is less than a first threshold, that an association of the plurality of first feature points and the plurality of second feature points is satisfactory; and
perform an estimation process that estimates a new position of the camera and a new orientation of the camera at the second time based on pairs of the plurality of first feature points and the plurality of second feature points.

12. The device according to claim 11, wherein the estimation process at the second time is not performed when the association is determined to be not satisfactory.

13. The device according to claim 11, wherein the processor is configured to determine, when an average of lengths of the plurality of vectors is less than a second threshold, that the association is satisfactory.

14. The device according to claim 11, wherein the processor is configured to determine, when an average of lengths of the plurality of vectors is less than a second threshold and a standard deviation of the lengths of the plurality of vectors is less than the first threshold, that the association is satisfactory.

15. The device according to claim 11, wherein the processor is configured to:
calculate a ratio of a number of vectors whose distance between a median and each of the plurality of vectors is greater than or equal to a third threshold, the median being determined based on of the plurality of vectors, and
determine that the association is satisfactory when the ratio is less than a fourth threshold.

16. The device according to claim 15, wherein the estimation process estimates the new position and orientation by using pairs of first feature points and second feature points whose distance between the median and an image associated vector is less than a fifth threshold.

17. The device according to claim 12, wherein the processor is configured to cause a display device to display information indicating that the estimation process is not performed when the association is determined to be not satisfactory.

* * * * *